United States Patent
Gabriel et al.

(10) Patent No.: US 9,749,241 B2
(45) Date of Patent: Aug. 29, 2017

(54) DYNAMIC TRAFFIC MANAGEMENT IN A DATA CENTER

(75) Inventors: Cynthia Ann Gabriel, Santa Clara, CA (US); Bill Shao, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1188 days.

(21) Appl. No.: 13/291,432

(22) Filed: Nov. 8, 2011

(65) Prior Publication Data

US 2012/0117228 A1 May 10, 2012

Related U.S. Application Data

(60) Provisional application No. 61/411,514, filed on Nov. 9, 2010.

(51) Int. Cl.
*G06F 15/173* (2006.01)
*G06F 15/16* (2006.01)
*H04L 12/70* (2013.01)
*H04L 12/24* (2006.01)
*H04L 29/08* (2006.01)

(52) U.S. Cl.
CPC ............ *H04L 47/00* (2013.01); *H04L 41/046* (2013.01); *H04L 67/1025* (2013.01)

(58) Field of Classification Search
CPC ..... H04L 45/00; H04L 45/70; H04L 45/7453; H04L 49/30; H04L 49/35; H04L 41/0896; H04L 43/04; H04L 45/021; H04L 45/14; H04L 45/745; H04L 47/726; H04L 49/3009; H04L 49/351

USPC .......................................................... 709/224
See application file for complete search history.

(56) References Cited

U.S. PATENT DOCUMENTS

| | | | | |
|---|---|---|---|---|
| 6,069,895 | A * | 5/2000 | Ayandeh | 370/399 |
| 7,102,996 | B1 * | 9/2006 | Amdahl et al. | 370/230 |
| 2003/0108052 | A1 * | 6/2003 | Inoue et al. | 370/399 |
| 2004/0243843 | A1 * | 12/2004 | Kadobayashi et al. | 713/201 |
| 2007/0274295 | A1 * | 11/2007 | Nishimura et al. | 370/352 |
| 2008/0066073 | A1 * | 3/2008 | Sen | G06F 9/505 718/105 |
| 2008/0117909 | A1 * | 5/2008 | Johnson | 370/392 |
| 2010/0054260 | A1 * | 3/2010 | Pandey et al. | 370/395.53 |

(Continued)

*Primary Examiner* — Phuoc Nguyen
*Assistant Examiner* — Kishin G Belani
(74) *Attorney, Agent, or Firm* — Schmeiser, Olsen & Watts LLP (57) ABSTRACT

A network element in a data center includes a plurality of servers and a switch. The switch includes a plurality of physical ports, a packet-forwarding table, and an application program interface (API) for modifying a packet-forwarding behavior of the switch. The packet-forwarding table determines a packet-traffic distribution across the servers by mapping packet traffic arriving at the switch to the plurality of ports. Each port of the plurality of physical ports is in communication with one of the servers. The network element further includes means for determining in real time the packet-traffic distribution across the servers, and means for dynamically changing the packet-traffic distribution across the servers in response to the determined packet-traffic distribution by modifying the packet-forwarding behavior of the switch through the API of the switch.

20 Claims, 7 Drawing Sheets

(56) References Cited

U.S. PATENT DOCUMENTS

2013/0138836 A1* 5/2013 Cohen et al. ................. 709/250
2013/0242983 A1* 9/2013 Tripathi et al. ............... 370/355

* cited by examiner

DYNAMIC TRAFFIC MANAGEMENT IN A DATA CENTER

RELATED APPLICATION

This application claims the benefit of U.S. Provisional Application No. 61/411,514, filed on Nov. 9, 2010, the entirety of which application is incorporated by reference herein.

FIELD OF THE INVENTION

The invention relates generally to data centers and data processing. More particularly, the invention relates to the dynamic management of traffic in a data center.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. In addition, data centers typically deploy network security components, such as firewalls, VPN (virtual private network) gateways, and intrusion detection systems.

In traditional networking, routers and switch devices usually refer to a MAC (Media Access Control) address, to a VLAN (Virtual Local Area Network) identifier, or to zoning information within a given packet to forward that packet. This packet-forwarding behavior limits addressing to one other system, namely, the next hop in the path toward the packet's destination. In the data center environment, such packet-forwarding behavior can affect performance. In addition, some resources of the data center can become bottlenecks in the processing of the packet traffic. The packet-forwarding behavior may then aggravate the undesirable condition.

SUMMARY

In one aspect, the invention relates to a network element comprising a plurality of servers, an ingress switch having a plurality of physical ports, a packet-forwarding table, and an application program interface (API) for modifying a packet-forwarding behavior of the ingress switch. The packet-forwarding table is configured to distribute packet traffic arriving at the ingress switch across the servers by mapping packets to the ports. Each port of the plurality of physical ports is in communication with one of the servers. The network element further comprises means for determining in real time a packet-traffic distribution across the servers, and means for dynamically changing the packet-traffic distribution across the servers in response to the determined packet-traffic distribution by modifying the packet-forwarding behavior of the ingress switch through the API of the ingress switch.

In another aspect, the invention relates to a switch comprising a plurality of physical ports and memory storing a packet-forwarding table having a plurality of table entries. Each table entry maps a value to one port of the plurality of physical ports. The switch further comprises a frame processor forwarding packets between physical ports. The frame processor is configured to compute a value from data in one or more fields of a received packet, to access a table entry of the packet-forwarding table using the computed value as an index into the packet-forwarding table, and to identify from the accessed table entry the port to which to forward the received packet. An application program interface (API) is configured to manage a packet-forwarding behavior of the frame processor in order to control a distribution pattern of packets across the plurality of ports.

In still another aspect, the invention relates to a computer program product for managing traffic in a switch comprising a plurality of physical ports, a frame processor forwarding packets between physical ports, and memory storing a packet-forwarding table having a plurality of table entries. Each table entry maps a value to one port of the plurality of physical ports. The computer program product comprises a computer-readable storage medium having computer-readable program code embodied therewith. The computer-readable program code comprises computer readable program code configured to compute a value from data in one or more fields of a received packet, computer readable program code configured to access a table entry of the packet-forwarding table using the computed value as an index into the packet-forwarding table, computer readable program code configured to identify from the accessed table entry the port to which the frame processor forwards the received packet; and computer readable program code configured to manage a packet-forwarding behavior of the frame processor in order to control a distribution pattern of packets across the plurality of ports.

In yet another aspect, the invention relates to a method of managing incoming packet traffic. The method comprises receiving packet traffic at a switch, distributing the packet traffic, by the switch, across a plurality of servers in accordance with a traffic management policy, monitoring a distribution pattern of the incoming packet traffic across the servers of the plurality of servers, and dynamically changing, by the switch, the distribution pattern of the packet traffic across the servers in response to the monitoring of the distribution pattern.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

As described herein, the network elements of a data center employ traffic management mechanisms for dynamically controlling the distribution of packet traffic internally within a given network element and externally among the various network elements of the data center. Each network element includes an ingress switch and an egress switch. The ingress switch of a given network element receives incoming packets, arriving either from client systems (when the ingress switch is at an ingress location of the data center) or from other network elements, and forwards the packets to servers within the network element. The egress switch of the given network element aggregates the packet traffic from the servers and forwards the packet traffic to other network elements.

Each switch has a packet-forwarding table that governs the distribution pattern of the traffic forwarded by that switch. Each switch also has an application program interface (API) by which to control the packet-forwarding behavior of that switch, for example, by changing the distribution pattern produced by that packet-forwarding table via the table entries, or by changing the function or algorithm used by the switch to acquire an entry from the packet-forwarding table. Such changes can be achieved dynamically. A server, the ingress switch, egress switch, or an external management agent can determine the actual traffic distribution produced by a given switch and change this distribution through the switch's API.

Figure 1:
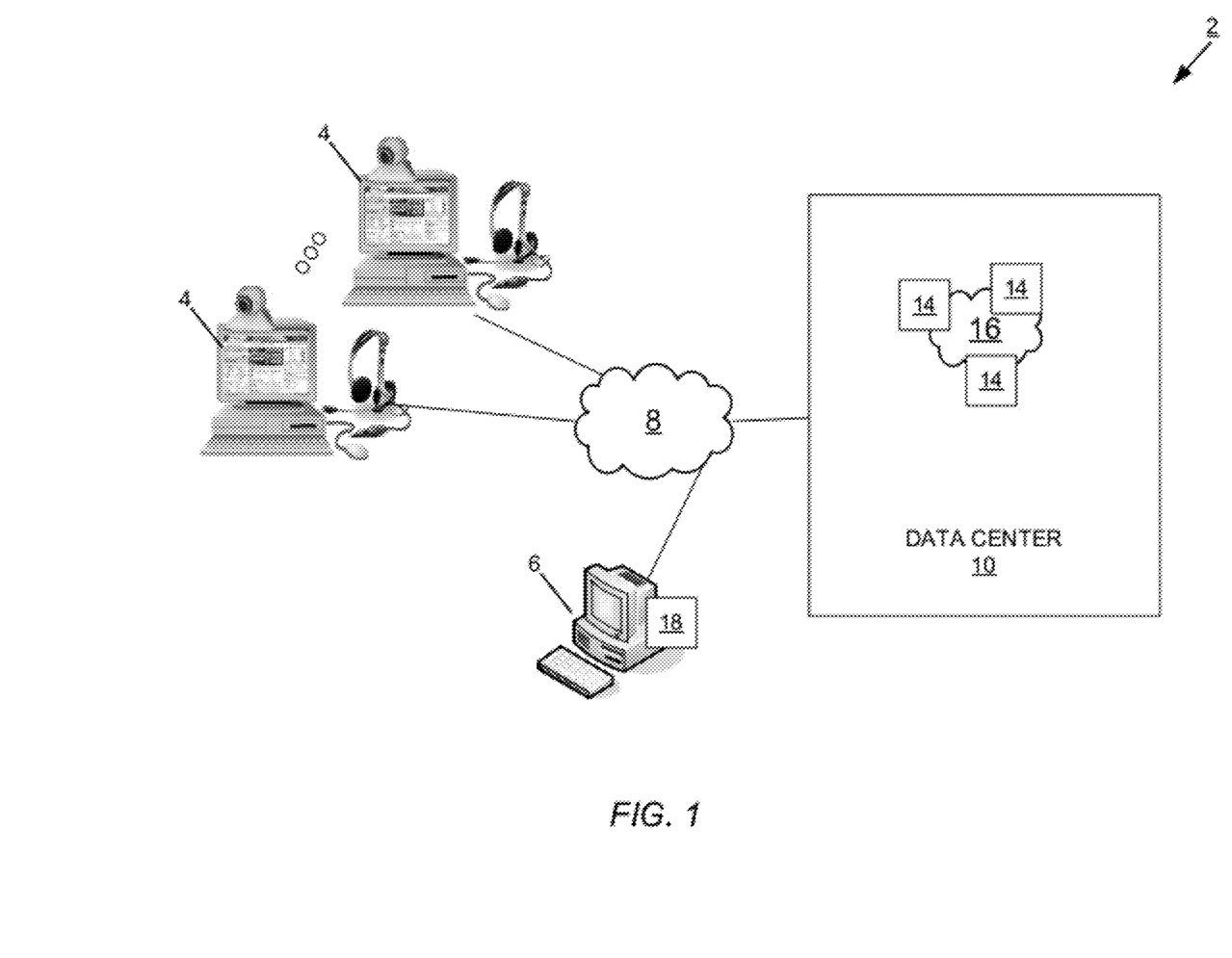
FIG. 1 is an embodiment of a networking environment including a data center with a plurality of network elements, a plurality of client systems, and a management station.

FIG. 1 shows an embodiment of a networking environment 2 including a data center 10, a plurality of client systems 4, and a management station 6 over a network 8. In general, the client systems 4 are computer systems running applications that require the services of the data center 10. The management station 6 provides a centralized point of administration for managing the data center 10. The client systems 4 and a management station 6 communicate with data center 10 over the network 8, embodiments of which include, but are not limited to, local-area networks (LAN), metro-area networks (MAN), and wide-area networks (WAN), such as the Internet or World Wide Web. Although shown external to the data center 10, in one embodiment, the management station 6 may be part of the data center 10 instead of communicating with the data center 10 over the network 8.

The data center 10 is generally a facility that houses various computers, routers, switches, and other associated equipment in support of applications and data that are integral to the operation of a business, organization, or other entities. The data center 10 includes a plurality of network elements 14 in communication with each other over a network 16 of communication links. Each of the network elements 14 are independent (standalone) electronic enclosures. The data center 10 can have fewer or more than the three network elements 14 shown. In addition, embodiments of the data center 10 may be at a single site or distributed among multiple sites.

In brief overview, the network elements 14 of the data center 10 provide switching and server services for packet-traffic from the client systems 4. Through an external management agent 18 running on the management station 6, an administrator of the data center 10 can communicate with one or more of the network elements 14 in order to statically configure and subsequently dynamically adjust the packet-switching behavior of the network elements 14, as described in more detail below. The management station 6 can connect directly (point-to-point) or indirectly to a given network element 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11 (g), 802.11(n)). Using a network protocol, such as Telnet or SNMP (Simple Network Management Protocol), the management station 6 can access a command-line interface (CLI) of the given network element 14.

Figure 2A:
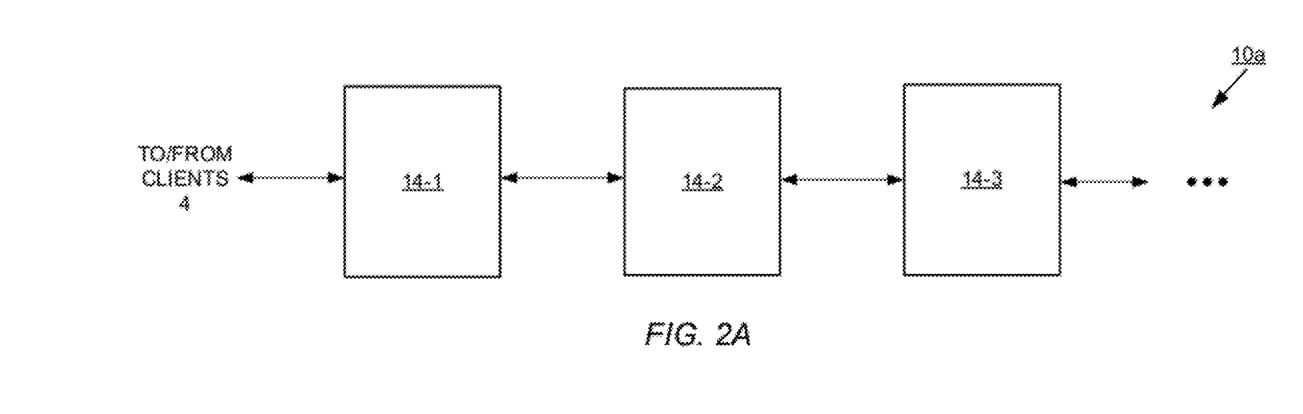
FIG. 2A, FIG. 2B, and FIG. 2C are block diagram representations of different interconnectivity among the network elements of the data center.
Figure 2B:
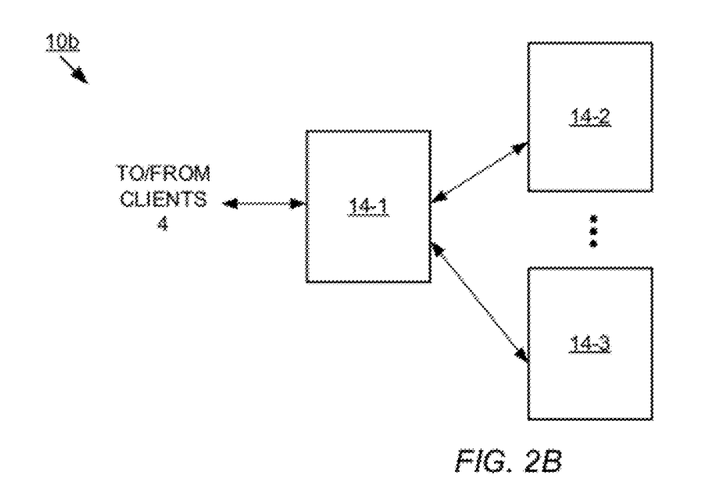
Figure 2C:
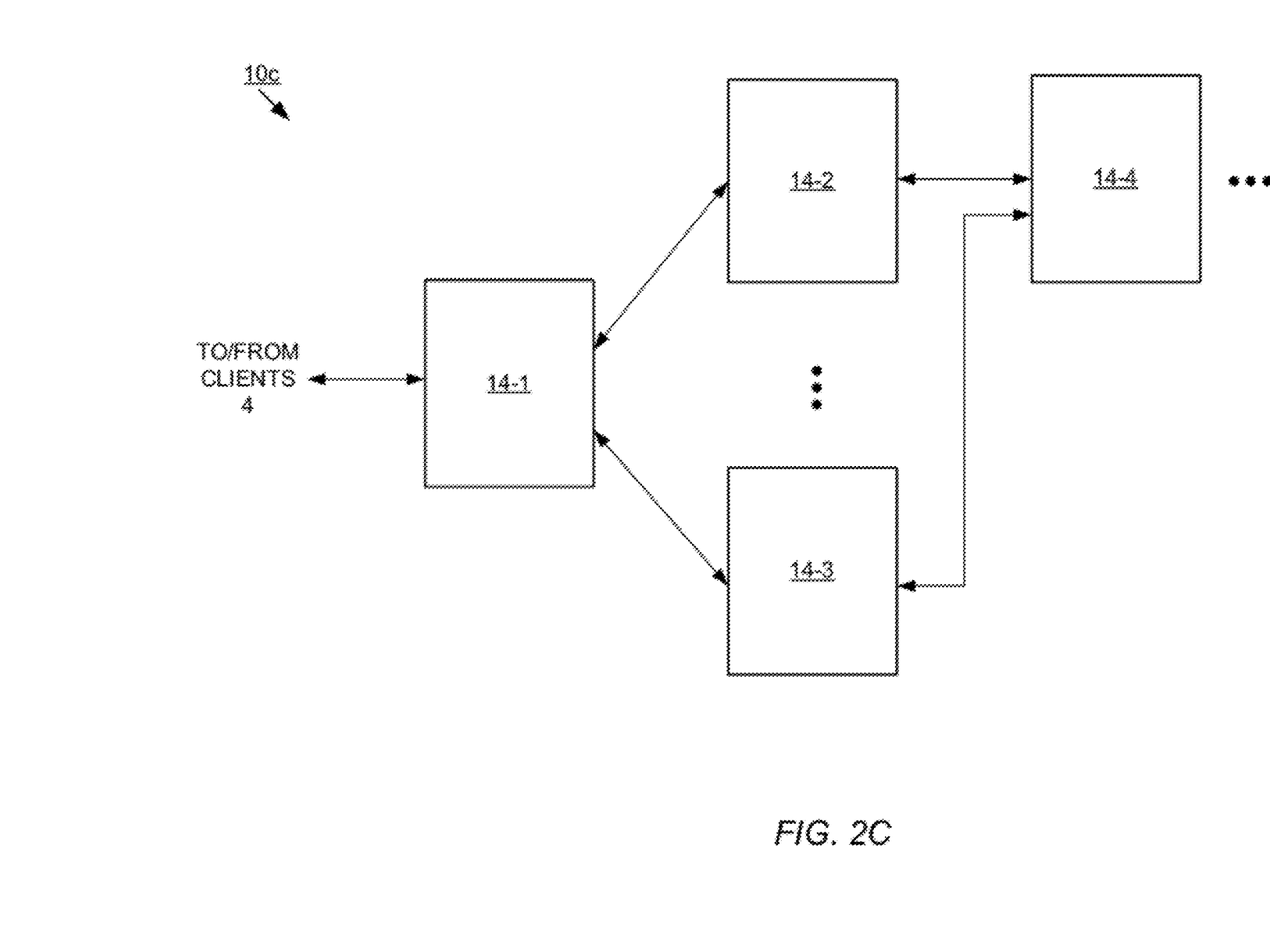

FIGS. 2A, 2B, and 2C show embodiments of different data center architectures that can apply the dynamic traffic management mechanisms described herein. In FIG. 2A, the data center 10a includes at least network elements 14-1, 14-2, 14-3 connected in daisy-chain fashion. The first network element 14-1 in the daisy chain is disposed at an ingress location of the data center 10a, where it is in communication with the client systems 4 and with the second network element 14-2 in the daisy chain. The second network element 14-2 is in communication with the third network element 14-3, and so on.

The data center 10b of FIG. 2B couples the network elements 14-1, 14-2, 14-3 in fan-out fashion. Again, the first network element 14-1 is disposed at an ingress location to the data center 10b, where the first network element 14-1 receives traffic from the plurality of client systems 4. The first network element 14-1 distributes those packets among the other network elements 14-2, 14-3, and so on.

In FIG. 2C, the network elements 14-1, 14-2, 14-3, and 14-4 of the data center 10c are coupled in mesh fashion. The mesh fashion combines aspects of the daisy-chain connectivity shown in FIG. 2A with aspects of the fan-out connectivity shown in FIG. 2B. The first network element 14-1 is coupled to network elements 14-2 and 14-3 in fan-out fashion, and each of these network elements 14-2 and 14-3 are coupled to network element 14-4 in daisy-chain fashion. The particular configuration of FIG. 2C is just one example; the number of possible configurations that are derivable from the combination of the daisy-chain and fan-out configurations is without known limit.

Here, again, the first network element 14-1 is disposed at an ingress location to the data center 10c and distributes those packets received from the client systems 4 among the network elements 14-2 and 14-3. Each network element 14-2, 14-3 forwards packets received from network element 14-1 to network element 14-4. Each of the other network elements 14-1, 14-2, 14-3, 14-4 can independently manage its own packet traffic dynamically as described herein.

Figure 3:
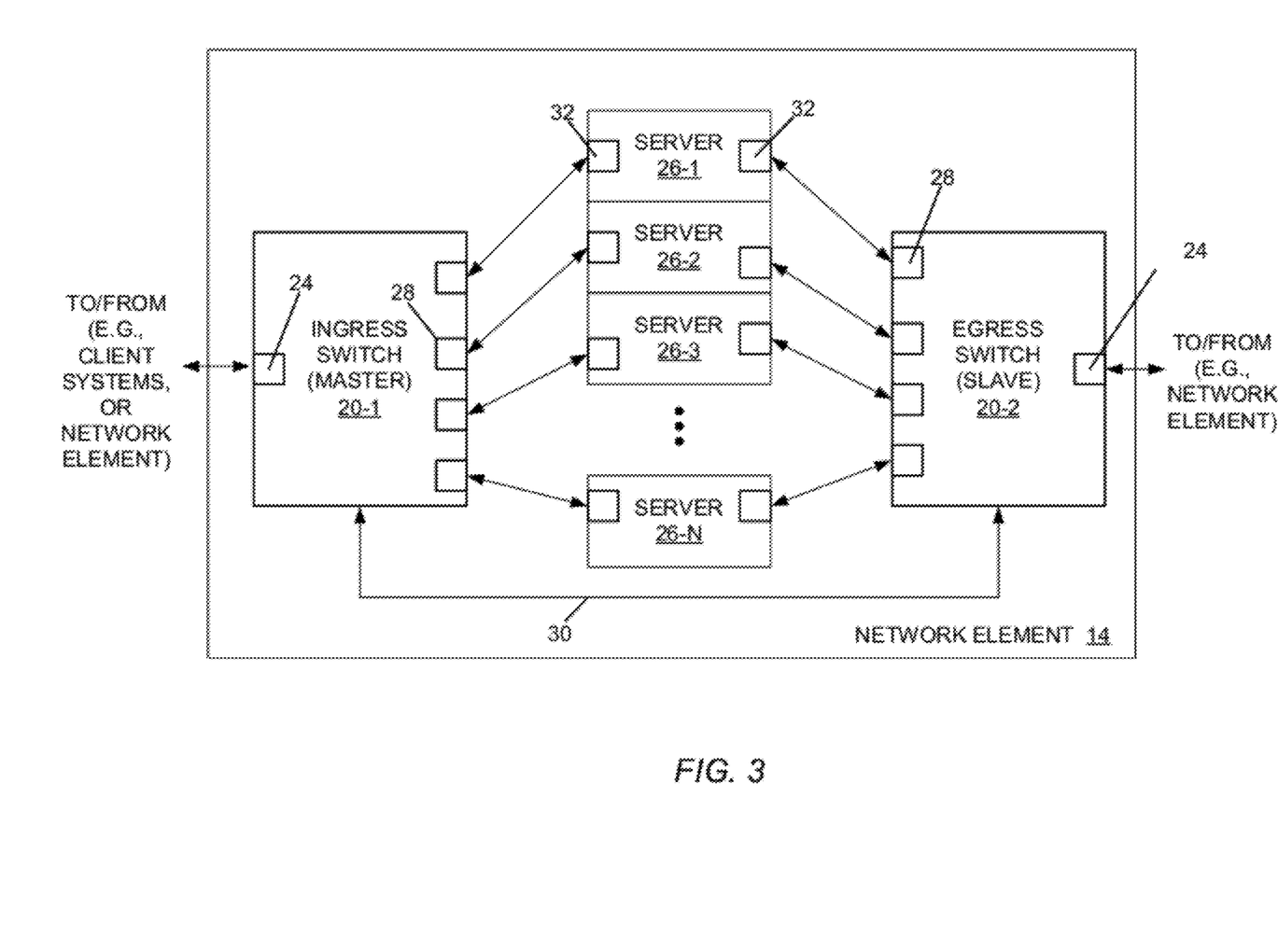
FIG. 3 is a functional block diagram of an embodiment of a network element including an ingress switch, an egress switch, and a plurality of servers, each server being in communication with the ingress switch and the egress switch.

FIG. 3 shows an embodiment of the network element 14 that can be deployed in any of the example data center architectures described in connection with FIG. 2A, FIG. 2B, and FIG. 2C. The network element 14 includes an ingress switch 20-1, an egress switch 20-2, and a plurality of servers 26-1, 26-2, 26-3, 26-N (generally, 26). Each server 26 is in communication with the ingress switch 20-1 and the egress switch 20-2. The ingress switch 20-1 may be referred to as the master switch; the egress switch 20-2, as the slave. The network element 14 provides bidirectional traffic handling.

Each switch 20-1, 20-2 (generally, 20) includes at least one externally facing port 24 and a plurality of server-facing ports 28. For a network element at an ingress location of the data center 10, the externally facing port 24 of the ingress switch 20-1 is in communication with the client systems 4; for network elements not at an ingress location, the externally facing port 24 of the ingress switch 20-1 is in communication with another network element. The externally facing port 24 of the egress switch 20-2 is in communication with another network element 14. The ingress and egress switches 20 can have more than one externally facing port 24. Each of the server-facing ports 28 of the ingress and egress switches is connected to a port 32 of a server 26. In addition, the ingress switch 20-1 and egress switch 20-2 are in communication with each other over an inter-switch link 30.

Each server 26 is a computer that provides one or more services to the data center 10, examples of which include, but are not limited to, email servers, proxy servers, DNS servers, proxy appliances, real servers. Examples of services that may be provided by the servers 26 include, but are not limited to, firewall services, Intrusion Prevention/Intrusion Detection (IPS/IDS) services, Server Load Balancing (SLB), and Application Delivery Centers (ADC) services. All of the servers 26 of the network element 14 may or may not perform the same function.

In brief overview, the ingress switch 20-1 and egress switch 20-2 have preconfigured traffic-management policies defined through user configuration. Any one or more of the ingress switch 20-1, egress switch 20-2, external management agent 18, or any of the servers 26 can dynamically change these policies of the switches during run time of the network element 14. The ingress switch 20-1 receives packet traffic over the externally facing port 24 and distributes the packet traffic across the servers 26. The ingress switch 20-1 distributes the incoming packet traffic in accordance with a traffic management policy currently in effect (e.g., as initially set by the user configuration for the ingress switch 20-1, or subsequently dynamically updated). Each server 26 performs its designated service or services, and, in general, forwards the serviced packet traffic to the egress switch 20-2. The egress switch 20-2 aggregates the packet traffic from the plurality of servers 26 and forwards the aggregate traffic out of the network element 14 through one or more of its externally facing ports 24. The egress switch 20-2 forwards the aggregate traffic in accordance with a traffic management policy currently in effect for the egress switch 20-2 (i.e., as initially set by the user configuration or subsequently dynamically updated).

Similarly, the egress switch 20-2 receives packet traffic over the externally facing port 24 and distributes the packet traffic across the servers 26. The egress switch 20-2 distributes the incoming packet traffic in accordance with a traffic management policy currently in effect (e.g., as initially set by the user configuration for the egress switch 20-2, or subsequently dynamically updated). Each server 26 performs its designated service or services, and, in general, forwards the serviced packet traffic to the ingress switch 20-1. The ingress switch 20-1 aggregates the packet traffic from the plurality of servers 26 and forwards the aggregate traffic out of the network element 14 through one or more of its externally facing ports 24. The ingress switch 20-1 forwards the aggregate traffic in accordance with a traffic management policy currently in effect for the ingress switch 20-1 (i.e., as initially set by the user configuration or subsequently dynamically updated).

Figure 4:
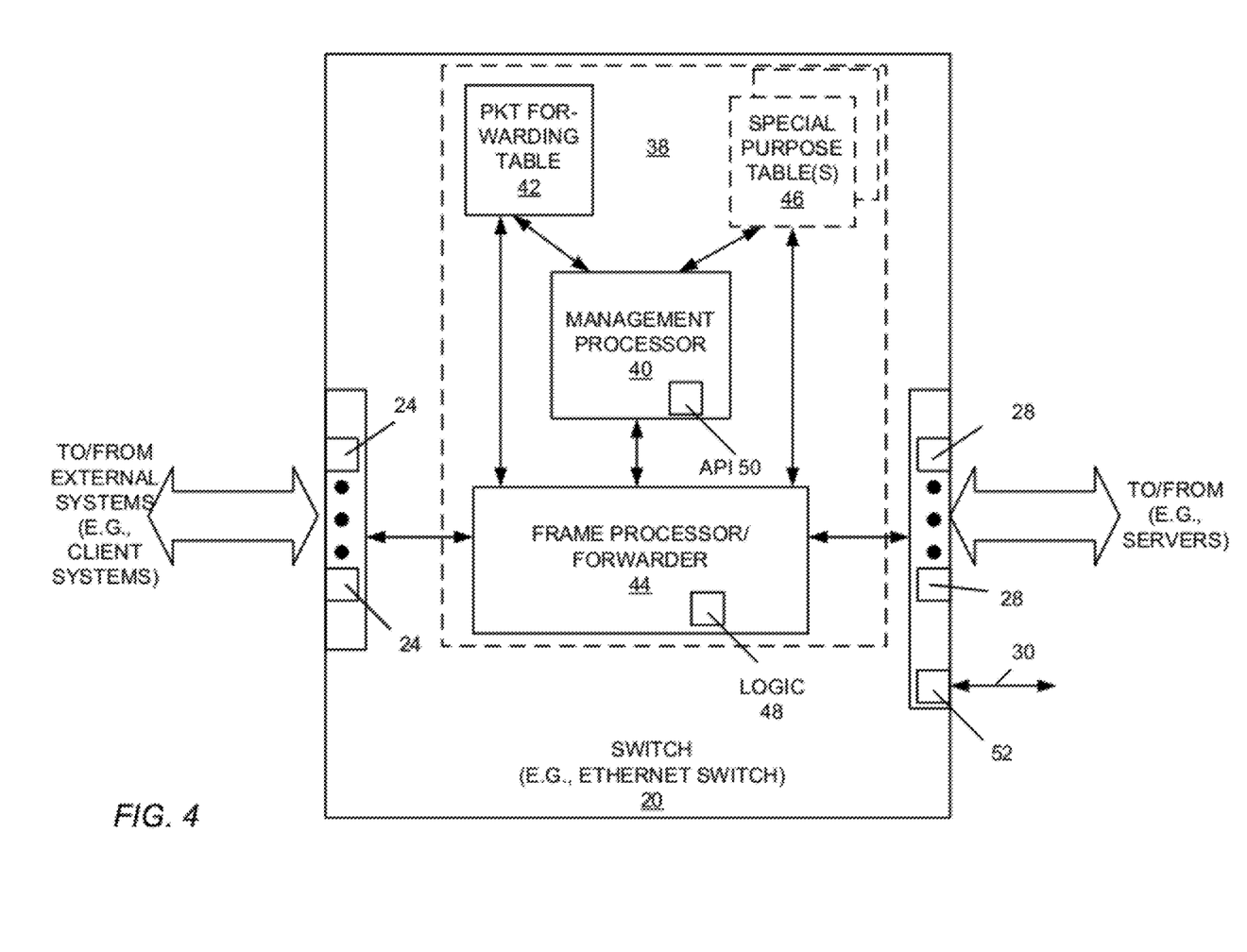
FIG. 4 is a functional block diagram of an embodiment of a switch.

FIG. 4 is a functional block diagram of an embodiment of the switch 20 (representative of the egress and ingress switches) including a plurality of externally facing ports 24 in communication with external systems (i.e., client systems or other network elements), and a plurality of server-facing ports 28. The switch 20 can have fewer or more than the number of ports shown. In one embodiment, the switch is an Ethernet switch and the ports 24, 28 of the switch support 10 GB line rates.

The switch 20 also includes a switching engine 38 comprised of a management processor 40, a packet-forwarding table 42, a frame processor/forwarder 44, and zero, one, or more special-purpose tables 46. Examples of the packet-forwarding table 42 may include, but are not limited to, an L2 forwarding table, L3 routing table, link aggregation (i.e. static or LACP trunk) table, Equal Cost Multi Path (ECMP) table, frame/field processor (i.e. access control list) table, etc. The switch 20 can be implemented with an ASIC (Application Specific Integrated Circuit) technology on one or more semiconductor chips. In general, the switching engine 38 bidirectionally forwards packets between externally facing ports 24 and server-facing ports 28.

The management processor 40 dynamically adds, removes, or modifies entries in the packet-forwarding table 42. The management processor 40 can constantly monitor the health of the servers 26 by using various health-check mechanisms. Examples of such health-check mechanisms include, but are not limited to, a link-state health check, a PING health check, an ARP (Address Resolution Protocol) health check, a UDP/TCP (User Datagram protocol/Transmission Control Protocol) health check, a service-based health check (i.e. HTTP, SMTP, SSL, SIP, etc.), and a user scriptable health check.

The packet-forwarding table 42 contains entries that determine the packet-forwarding behavior of packet traffic arriving at the switch 20 through one of its externally facing ports 24. In either instance of the ingress switch 20-1 or egress switch 20-2, each entry of the packet-forwarding table 42 maps a unique value to one of the server-facing ports 28 of the switch 20, each of such ports 28 being connected to a port 32 of one of the servers 26 of the plurality of servers. In general, the table entries of the packet-forwarding table 42 affect the distribution of the incoming packet traffic across the servers in accordance with a traffic management policy. In one embodiment, the entries of the packet-forwarding table 42 are configured such that incoming packet traffic arriving at the switch 20 through one of its externally facing ports 24 is load balanced across the servers 26 through one of the server-facing ports 28.

In either instance of the ingress switch 20-1 or egress switch 20-2, a special-purpose table 46 may be employed to uniquely map each entry to one of the externally facing ports 24 of the switch, each of such ports 24 being connected to a network element 14. In general, the special-purpose table 46 establishes the distribution of the packet traffic (arriving from the servers 26 through one of the server-facing ports 28) across the externally facing ports 24 (and, thus, across the other network elements 14) in accordance with a traffic management policy. In one embodiment, the entries of the special-purpose table 46 are configured such that the outgoing packet traffic arriving at the switch 20 through one of its server-facing ports 28 is inspected to selectively choose a specific externally facing port 24 to egress out to the network elements 14. In another embodiment, the special-purpose table 46 may not be configured at all, in which case, outgoing packet traffic arriving at the switch 20 through one of its server-facing ports 28 is forwarded out to the network elements 14 connected to its externally facing ports 24 using standard L2 forwarding or L3 routing policies.

The frame processor/forwarder 44 includes logic 48 for executing the flow distribution process. The logic 48 may be implemented as hardware, software, or a combination of hardware and software. In general, the logic 48 examines specific content in the header of a received packet, generates a value based on header content of the frame, uses the generated value as an index into the packet-forwarding table 42, and, based on the server port identified in the accessed table entry, redirects the packet to that server-facing port 28 of the switch. The specific content examined by the logic 48 can be based on a user-specified function or algorithm and is part of the traffic management policy used by the switch to distribute packet traffic.

In addition, the logic 48 of the switch 20 can monitor the traffic distribution pattern (e.g., a one-second moving window of the number of packets forwarded to each of the server-facing ports 28), record that traffic pattern in memory, and transmit the recording to one or more of the servers 26 or to one or more external management agents 18 (FIG. 1). Alternatively, an external management agent 18 can request the state of the packet-forwarding table 42 from the switch 20 in addition to the packet-to-server distribution statistics in order to facilitate the monitoring of the traffic distribution pattern.

The switch 20 can also include special-purpose table(s) 46 for particular traffic-management applications, for example, traffic prioritization, Service Level Agreement (SLA) enforcement, selective remote data backup, and cached data retrieval. Like those of the packet-forwarding table 42, each entry of a special-purpose table 46 can map a value to a server port 28 or to any other port such as an external facing port 24 or an inter-switch link 30. Embodiments of switches that have such table(s) 46 can use them in conjunction with or instead of the packet-forwarding table 42. Alternatively, the special-purpose table(s) 46 can be implemented as special-purpose entries within the packet-forwarding table 42, instead of as separate tables.

The switch 20 also includes an application program interface (API) 50 through which the packet-forwarding behavior of the switch 20 can be configured and dynamically reconfigured. Here, for example, the management processor 40 has the API 50. The API 50 enables other components to communicate with the switch 20 to change one or more entries of the packet-forwarding table 42, of a special-purpose table 46, the function or algorithm by which index values are generated from incoming packets, or a combination thereof. For example, the external management agent 18 or any of the servers 26 can use the API 50 to manipulate the packet-forwarding table 42 (and any special-purpose table 46) on both the ingress and egress switches. In addition, the ingress switch 20-1 can use the API 50 of the egress switch 20-2 to alter the packet-forwarding behavior of the egress switch 20-2, and conversely, the egress switch 20-2 can use the API 50 of the ingress switch 20-1 to alter the packet-forwarding behavior of the ingress switch 20-1. (When one switch controls the packet-forwarding behavior of the other switch, typically the master switch manipulates the packet-forwarding table 42, logic 48, on both of the ingress (master) and egress (slave) switches through the API 50 of that switch 20). Such inter-switch communications can occur over the inter-switch link 30 (the switch 20 can have a dedicated port 52 for this link 30) or over one of the available server-facing ports 28 if the inter-switch link 30 is unavailable or not configured. In addition, the switch 20 itself can change its own traffic distribution pattern by changing its own table entries and/or the function used to derive an index value into the packet-forwarding table 42.

Figure 5:
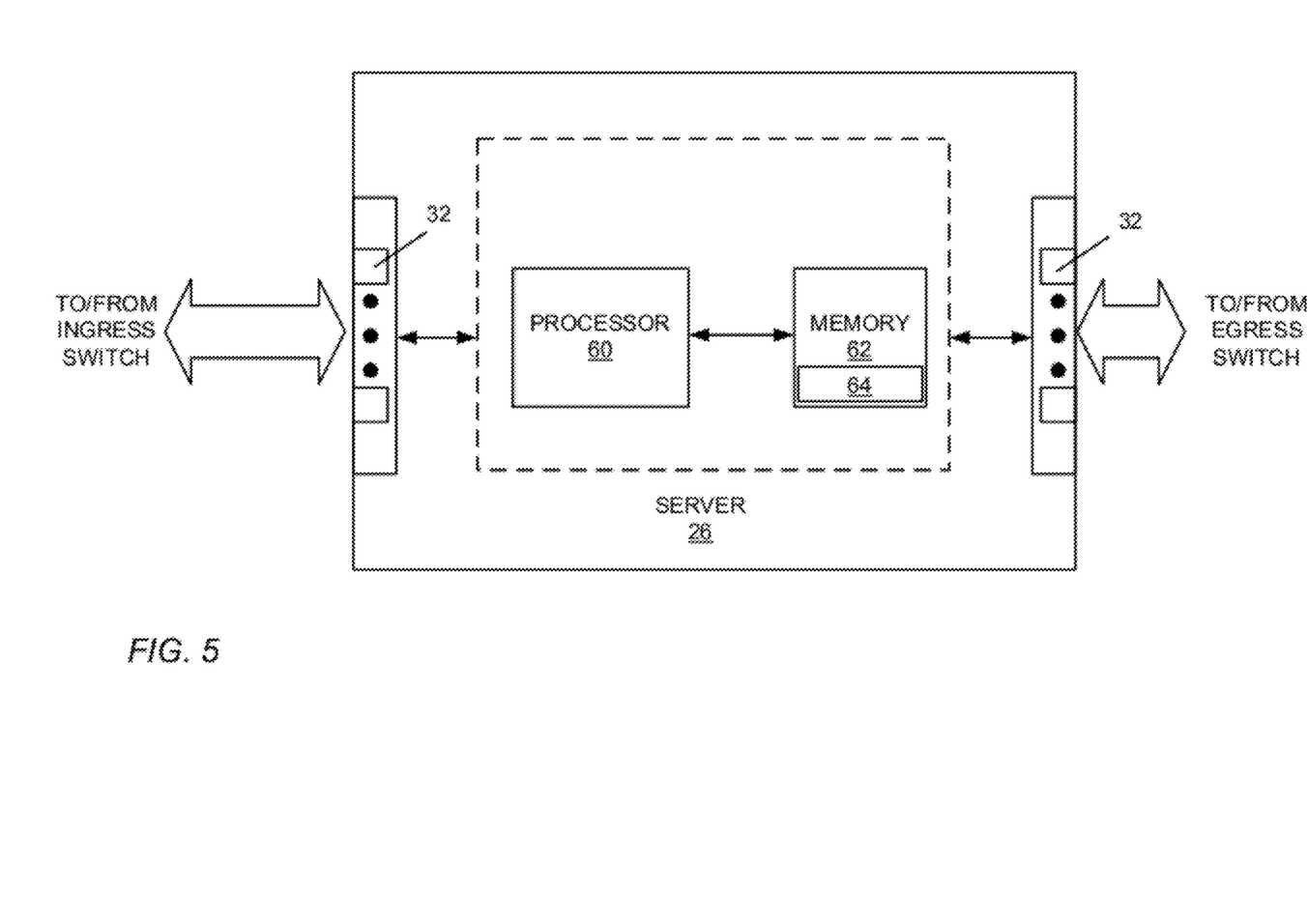
FIG. 5 is a functional block diagram of an embodiment of a server.

FIG. 5 shows an embodiment of the server 26 including a processor 60 in communication with memory 62. The memory 62 can also be used to store traffic distribution records collected by the ingress switch 20-1, the egress switch 20-2, or both. In one embodiment, the memory 62 stores program code or logic 64, which, when executed by the processor 60, is configured to 1) acquire a traffic distribution from one of the switches; 2) analyze the traffic distribution; 3) determine a desired changed to the traffic distribution; and 4) communicate with the ingress switch 20-1, egress switch 20-2, or both, through the API 50 of that switch 20, to implement the desired change by changing the packet-forwarding behavior of the switch 20 (e.g., through modifications to entries of the packet-forwarding table 42 or to the function used to compute an index value for accessing the table 42).

Figure 6:
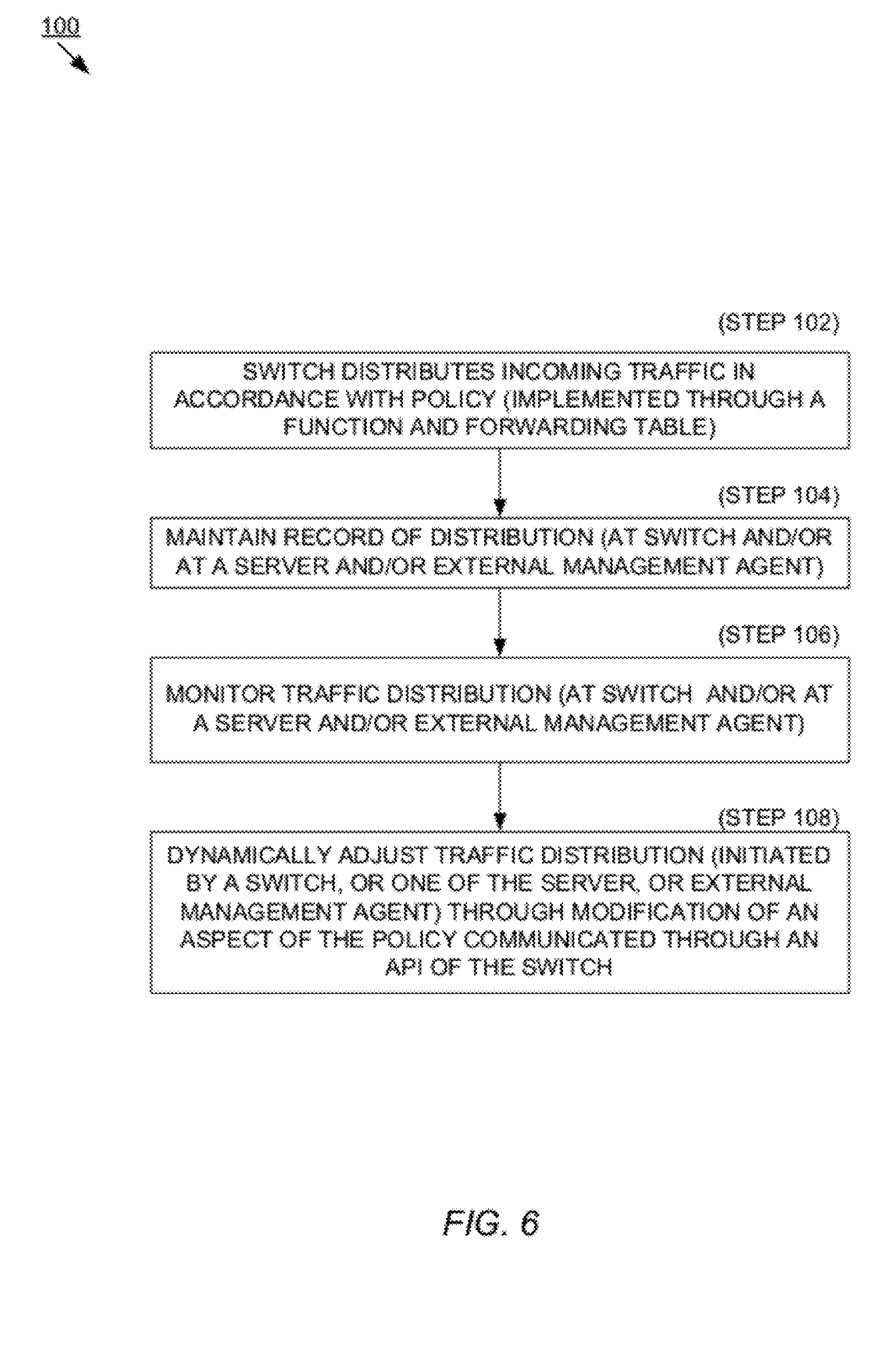
FIG. 6 is a flow diagram of an embodiment of a process for dynamically managing traffic through a data center.

FIG. 6 shows an embodiment of a process 100 for dynamically managing traffic through the data center 10. Although described primarily with reference to the ingress switch 20-1, the process 100 applies similarly to the dynamic management of traffic passing through the egress switch 20-2. At step 102, the ingress switch 20-1 distributes incoming traffic across the servers 26 in accordance with a traffic management policy as configured by the entries of the packet-forwarding table 42 and the function (or algorithm) used to access an entry in the table 42. Specifically, a frame or packet arrives at an externally facing port 24 of the ingress switch 20-1. The ingress switch 20-1 examines header contents of the packet. In accordance with a function or algorithm, the ingress switch 20-1 produces a value. This value serves as an index into the packet-forwarding table 42 of the ingress switch 20-1, for selecting a table entry. Each table entry maps to a server-facing port 28 of the ingress switch 20-1, and thus to the server 26 connected to that port. That packet, in effect, is allocated to a particular "bucket" or queue of packets being sent through the identified port to the corresponding server 26. The ingress switch 20-1 forwards the packet to the identified port. Before forwarding the packet, the ingress switch 20-1 can modify the contents of a field (e.g., the VLAN tag, the Media Access Control or MAC address, etc.) in the header of the packet.

In general, the function or algorithm used by the ingress switch 20-1 to produce the value is designed to produce a large number of different outcomes (i.e., buckets). For example, a function that produces a value from the last three bits of the destination IP address has eight different possible outcomes (000b to 111b or hash values 0 to 7). Another function that looks at the last six bits of the destination IP address has sixty-four different possible outcomes (000000b to 111111b or hash values 0 to 63). In general, the greater the number of buckets and range of hash values, the lesser is the chance of a traffic bottleneck within the ingress switch 20-1.

The ingress switch 20-1 produces (step 104) a running record of the distribution of the incoming traffic. In one embodiment, the ingress switch 20-1 generates and sends this record of traffic distribution to a designated one of the servers 26, for storing at that server—servers generally having greater resources, such as memory and processing power, than the switch 20. As an example, the switch 20 can aggregate forwarding decisions for one second, and then send the aggregate to the server 26. Alternatively, the switch 20 can transmit each forwarding decision to the server 26 in real time; that is, after making each individual forwarding decision. In another embodiment, the ingress switch 20-1 transmits the record (aggregate or incremental) to the external management agent 18 for storage and/or decision-making.

By accessing this record, any one of the servers 26, external management agent 18, ingress switch 20-1, and egress switch 20-2, or any combination thereof, can monitor (step 106) the traffic distribution. For example, the ingress switch 20-1 can locally monitor the traffic distribution (or access the record of traffic distribution stored at the server 26), the egress switch 20-2 can access the traffic distribution record stored at the server 26, or the external management agent 18 can access the traffic distribution record stored locally at the management station 6 or remotely at the server 26.

Based on the record of traffic distribution, any one of the servers 26, external management agent 18, ingress switch 20-1, and egress switch 20-2, or any combination thereof, can initiate a dynamic adjustment (step 108) to the traffic distribution. For example, from the traffic distribution, a distribution-monitoring server can determine that there exists an undesirable imbalance of traffic among the plurality of servers, or that one of the servers is grossly overloaded. Through the API 50 of the ingress switch 20-1, the distribution-monitoring server can change the particular function or table entries of the packet-forwarding table 42 used by the ingress switch 20-1 to forward packets. For example, consider that, when the server 26 determines to change the algorithm, the switch 20 is currently configured to inspect the last three bits of the destination IP address. The server 26 can then instruct the switch 20 to start inspecting the last three bits of the source IP address instead, provided the switch 20 is capable of the proposed change. Other examples can include changing the particular field of the packet header to be examined, or to start using a combination of prescribed fields.

Alternatively or additionally, the server 20 can change particular table entries of the packet-forwarding table 42. For example, consider that server 26-1 is currently overloaded, and that table entry [101b] of the packet-forwarding table 42 maps to server 26-1. The distribution-monitoring server can initiate a change to table entry [101b] so that the table entry subsequently maps to server 26-3. As a result, any subsequent incoming traffic that produces an index value corresponding to table entry [101b], instead of forwarding this traffic to server 26-1, the ingress switch 20-1 now forwards it to server 26-3.

In other embodiments, the ingress switch 20-1, the egress switch 20-2, or both, or the external management agent 18, instead of the server 20, can decide to dynamically change the traffic distribution, either by altering the packet-forwarding table 42 or the function (or algorithm) used to select a bucket. For example, if the ingress switch 20-1, the egress switch 20-2, or both, or the external management agent 18, or the servers 26 themselves detect traffic congestion due to overutilization of one or more servers 26, any one of these entities can decide to dynamically change the traffic distribution. This can be achieved by altering the packet-forwarding table 42 to replace any entry or entries that reference an oversubscribed server 26 with a new table entry that subsequently maps to an externally facing port 24 or an inter-switch link 30 designated for carrying unprocessed frames (e.g., an overload port). This can also be achieved by altering the function (or algorithm) to select a bucket that maps to a pre-defined reference to an externally facing port 24 or an inter-switch link 30 designated for carrying unprocessed frames (e.g., an overload port). As a result, any subsequent incoming traffic that produces an index value corresponding to a table entry that maps to the overload port, instead of forwarding this traffic to an oversubscribed server 26, the ingress switch 20-1 now forwards the packet out of the network element 14 through an externally facing port 24 or an inter-switch link 30 designated for carrying unprocessed frames (e.g., an overload port). This overload port connects or forwards traffic to another network element 14 (as illustrated in FIG. 2A, 2B, or 2C) for processing the packet. This other network element 14 can likewise be overloaded and forward the packet through its own overload port to yet a third network element 14. Accordingly, the monitoring of the traffic pattern advantageously enables load balancing and/or traffic management at the data center level.

Upon receiving a packet from the ingress switch 20-1, a destination server 26 inspects the packet, and based on the content of the frame header, such as that of the VLAN tag, determines the type of action to be performed. Using a field, such as the VLAN tag, the servers 26 can also influence the forwarding behavior of the egress switch 20-2. For example, the ingress switch 20-1 may route a packet to a congested server. Instead of processing the packet, the server can modify the contents of the VLAN tag to signal an overloaded state, and then forward the packet to the egress switch 20-2. The egress switch 20-2 examines the VLAN tag, recognizes the overloaded status, and forwards the packet out of the network element 14 through an externally facing port 24 designated for carrying unprocessed frames (e.g., an overload port). This overload port connects or forwards traffic to another network element 14 (as illustrated in FIG. 2A, 2B, or 2C) for processing the packet. This other network element 14 can likewise be overloaded and forward the packet through its own overload port to yet a third network element 14. Accordingly, the monitoring of the traffic pattern advantageously enables load balancing and/or traffic management at the data center level.

Based on the traffic distribution pattern, one or more of the network elements 14 in the data center can be turned off (e.g., after business hours, one or more of the network elements 14 may be underutilized). One of the servers 26, the ingress switch 20-1, or egress switch 20-2 can detect this underutilization in response to monitoring the traffic distribution produced by the switch 20, and initiate a communication to an administrator to turn a network element 14 off. Moreover, to enable turning off network elements 14, either switch 20 can intentionally induce underutilization of a network element by directing traffic elsewhere.

The aforementioned principles can extend to the dynamic (run-time) management of traffic distribution across virtual ports of a switch 20 (e.g., ingress, egress switch), wherein the switch 20 logically partitions a physical port (e.g., externally facing port 24) into a plurality of virtual ports and switches traffic between source and destination virtual ports. The source and destination virtual ports have associated queues; and the packet-traffic distribution is managed at the virtual port level, being internally routed within the switch 20 between the ingress and egress queues.

Similar to the traffic monitoring described above, any one of the switches 20, servers 26, or external management agent 18 can monitor and analyze the packet traffic distribution among the ingress and egress queues of the (ingress and/or egress) switch 20. Such monitoring can occur through another API supported by the switch 20; or the switch 20 can transmit the packet-traffic distribution information to a server 26 or to the external management agent 18. To alter the traffic distribution pattern among these queues, any one of the switches 20, servers 26, or external management agent 18 can communicate with the switch 20 through this additional API of the switch. Instead of altering the switch's table and/or the function by which values are generated, this embodiment affects how the frame processor of the switch pre-classifies an incoming frame. Such pre-classification determines the source and destination virtual ports (and their corresponding queues) with which the packet becomes associated, and such virtual ports and their queues determine how such packets are processed (routed) within the switch 20. The logic for dynamically adjusting traffic distribution at the virtual port level and the logic for dynamically adjusting traffic distribution at the server (i.e., physical port) level can be implemented together within a single switch 20.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A network element, comprising:
a plurality of servers;
an ingress switch having:
 a plurality of physical ports,
 a packet-forwarding table,
 an application program interface (API) for modifying how the ingress switch forwards packets to the plurality of physical ports,
 wherein the packet-forwarding table is configured to distribute packet-traffic arriving at the ingress switch across the plurality of servers by mapping packets to ports, each port of the plurality of physical ports being in communication with one of the servers; and
 a logic device configured to determine, in real time, a running record of distribution of received packet-traffic across the plurality of servers to estimate a load on each server, and to identify servers that are oversubscribed;
an egress switch in communication with the plurality of servers using dedicated lines, the egress switch having:
 one or more physical ports, a second packet-forwarding table, and
 a second API for modifying how packets are forwarded through the egress switch, each port of the one or more physical ports of the egress switch being in communication with an external network element, the second packet-forwarding table being configured to distribute packet-traffic arriving from the plurality of servers across the physical ports of the egress switch;
a communication link between ingress switch and the egress switch over which one of the ingress and egress switches can change how the packets are forwarded in the other of the ingress and egress switches through the API of that other switch;
wherein at least one of the group consisting of the ingress switch, a server of the plurality of servers, and an external management agent receives the running record of distribution of received packet-traffic to determine if there is an undesirable imbalance among the plurality of servers, to estimate a load on each server, and to identify servers that are oversubscribed, and use the API to dynamically cause the ingress switch to modify packet-traffic distribution pattern across the plurality of servers by redirecting packets originally intended for the oversubscribed servers to a server that is not oversubscribed.

2. The network element of claim 1, wherein at least one of the group consisting of the ingress switch, a server of the plurality of servers, and an external management agent is configured to dynamically change the packet-traffic distribution pattern across the plurality of servers through the API by changing a function used by the ingress switch to compute a value for an incoming packet, the computed value serving as an index into the packet-forwarding table of the ingress switch to acquire an entry in the packet-forwarding table, the acquired entry mapping the incoming packet to one of the physical ports.

3. The network element of claim 1, wherein at least one of the group consisting of the ingress switch, a server of the plurality of servers, and an external management agent is configured to dynamically change the packet-traffic distribution pattern across the servers by modifying one or more entries in the packet-forwarding table of the ingress switch.

4. The network element of claim 1, wherein a server of the plurality of servers is configured to dynamically change the packet-traffic distribution pattern across the servers.

5. The network element of claim 1, wherein the egress switch is configured to dynamically change the packet-traffic distribution pattern across the plurality of servers.

6. A network element comprising:
a plurality of servers;
an ingress switch comprising:
 a plurality of physical ports;
 memory storing a packet-forwarding table having a plurality of table entries, each table entry mapping a value to one port of the plurality of physical ports;
 a frame processor forwarding packets between physical ports, the frame processor being configured to compute a value from data in one or more fields of a received packet, to access a table entry of the packet-forwarding table using the computed value as an index into the packet-forwarding table, and to identify from the accessed table entry the port to which to forward the received packet;

an external management agent;

a logic device configured to determine, in real time, a running record of distribution of received packet-traffic; and an application program interface (API) configured to dynamically modify how the frame processor distributes packets across the plurality of ports by redirecting packets originally directed to an oversubscribed port to another port that is not oversubscribed;

an egress switch in communication with the plurality of servers using dedicated lines, the egress switch having one or more physical ports, a second packet-forwarding table, and a second API for modifying how packets are forwarded through the egress switch, each port of the one or more physical ports of the egress switch being in communication with an external network element, the second packet-forwarding table being configured to distribute packet-traffic arriving from the plurality of servers across the physical ports of the egress switch;

a communication link between ingress switch and the egress switch over which one of the ingress and egress switches can change how the packets are forwarded in the other of the ingress and egress switches through the API of that other switch;

wherein at least one of the group consisting of the ingress switch, a port of the plurality of ports or the external management agent receives the running record of distribution of received packet-traffic to determine if there is an undesirable imbalance across the plurality of ports to estimate packet-traffic to each port and to identify when the packet-traffic exceeds a predetermined packet-traffic rate indicating an oversubscribed port.

7. The network element of claim 6, further comprising logic configured to determine whether to change the distribution pattern if there is an undesirable imbalance across the plurality of ports.

8. The network element of claim 6, further comprising logic configured to change dynamically one or more mappings provided by the table entries of the packet-forwarding table.

9. The network element of claim 6 further comprising logic configured to change dynamically a function by which the frame processor computes the value used as an index into the packet-forwarding table.

10. The network element of claim 6 further comprising logic configured to transmit information about the packet-traffic distribution pattern to one or more of a server, an external management agent, or another switch.

11. A computer program product for managing traffic in a data center having an ingress switch comprising a plurality of physical ports, a frame processor forwarding packets between physical ports, memory storing a packet-forwarding table having a plurality of table entries, each table entry mapping a value to one port of the plurality of physical ports, an egress switch in communication with the plurality of servers using dedicated lines, the egress switch having:
one or more physical ports,
a second packet-forwarding table, and
a second API for modifying how packets are forwarded through the egress switch, each port of the one or more physical ports of the egress switch being in communication with an external network element, the second packet-forwarding table being configured to distribute packet-traffic arriving from the plurality of servers across the physical ports of the egress switch;

a communication link between ingress switch and the egress switch, the computer program product comprising:
a computer-readable storage medium having computer-readable program code embodied therewith, the embodied computer-readable program code comprising:

computer readable program code configured to compute a value from data in one or more fields of a received packet;

computer readable program code configured to access a table entry of the packet-forwarding table using the computed value as an index into the packet-forwarding table;

computer readable program code configured to identify from the accessed table entry the port to which the frame processor forwards the received packet;

computer readable program code configured to determine, in real time, a running record of distribution of received packet-traffic to determine if there is an undesirable imbalance among the plurality of ports to estimate when packet-traffic to a port exceeds a predetermined level indicating an oversubscribed port;

computer readable program code configured to run in the egress switch adapted to communicate through the communication link to the API of the ingress switch causing it to change how the packets are forwarded;

computer readable program code run in the ingress switch adapted to communicate through the communication link to the API of the egress switch causing it to change how the packets are forwarded; and computer readable program code configured to dynamically redirect packet-traffic originally directed to an oversubscribed port to another port which is not oversubscribed and if there are no ports that are not oversubscribed, then to the interswitch link.

12. The computer program product of claim 11 wherein the embodied computer readable program code further comprises computer readable program code configured to monitor a distribution of frames among the plurality of physical ports, and in response, to determine whether to change the distribution.

13. The computer program product of claim 11 wherein the embodied computer readable program code further comprises computer readable program code configured to change dynamically one or more mappings provided by the table entries of the packet-forwarding table.

14. The computer program product of claim 11 wherein the embodied computer readable program code further comprises computer readable program code configured to change dynamically a function used to compute the value used as an index into the packet-forwarding table.

15. The computer program product of claim 11 wherein the embodied computer readable program code further comprises computer readable program code configured to transmit information about the packet distribution to at least one of a server, an external management agent, or another switch.

16. A method of managing packet-traffic, the method comprising:
receiving packet-traffic at an ingress switch; having a packet-forwarding table to distribute the received packet-traffic across a plurality of servers in accordance with a traffic management policy;

employing a logic device to determine, in real time, a running record of distribution of received packet-traffic;

employing an egress switch in communication with the plurality of servers using dedicated lines, the egress switch having one or more physical ports, a second packet-forwarding table, and a second API for modifying how packets are forwarded through the egress switch, each port of the one or more physical ports of the egress switch being in communication with an external network element, the second packet-forwarding table being configured to distribute packet-traffic arriving from the plurality of servers across the physical ports of the egress switch;

employing one of the group consisting of a switch, a server of the plurality of servers, and an external management agent to receive the running record of distribution of received packet-traffic across the plurality of servers to estimate a load on each server, and to identify which servers are oversubscribed; and employing one of the group consisting of the switch, a server of the plurality of servers, and an external management agent to cause an application program interface (API) to dynamically redirect packet-traffic originally directed to an oversubscribed server to another server which is not oversubscribed;

employing a communication link between ingress switch and the egress switch over which one of the ingress and egress switches can change how the packets are forwarded in the other of the ingress and egress switches through the API of that other switch.

17. The method of claim 16, further comprising recording, by the switch, the packet-traffic distribution pattern across the plurality of servers for a predetermined duration.

18. The method of claim 17, further comprising transmitting, by the switch, the recording of the packet-traffic distribution pattern to one of the plurality of servers.

19. The method of claim 17, further comprising transmitting, by the switch, the recording of the packet-traffic distribution pattern to an external management agent.

20. The method of claim 16, wherein the dynamically changing the packet-traffic distribution pattern includes altering table entries in a packet-forwarding table of the switch used to map packets to ports of the switch.

* * * * *